(12) United States Patent
Sobolewski et al.

(10) Patent No.: US 9,512,711 B2
(45) Date of Patent: Dec. 6, 2016

(54) PORTABLE ATTACHMENT OF FIBER OPTIC SENSING LOOP

(71) Applicant: Halliburton Energy Services, Inc., Houton, TN (US)

(72) Inventors: Zbigniew Sobolewski, Houston, TX (US); Ronald L. Spross, Houston, TX (US); Gary Nguyen, Richmond, TX (US); Mark A. Sitka, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 14/411,198

(22) PCT Filed: Feb. 24, 2014

(86) PCT No.: PCT/US2014/017983
§ 371 (c)(1),
(2) Date: Dec. 24, 2014

(87) PCT Pub. No.: WO2015/126421
PCT Pub. Date: Aug. 27, 2015

(65) Prior Publication Data
US 2016/0230534 A1     Aug. 11, 2016

(51) Int. Cl.
*G02B 6/00*      (2006.01)
*E21B 47/00*    (2012.01)
(Continued)

(52) U.S. Cl.
CPC ........... *E21B 47/0006* (2013.01); *E21B 47/01* (2013.01); *G01L 1/242* (2013.01); *E21B 47/011* (2013.01);
(Continued)

(58) Field of Classification Search
CPC ... G02B 6/3608; G02B 6/3636; G02B 6/4457; G01L 1/24; G01L 1/242; E21B 47/011; E21B 47/0006; E21B 47/01
(Continued)

(56) References Cited

U.S. PATENT DOCUMENTS 1,852,347 A    4/1932  Getz
3,602,036 A    8/1971  Peterson et al.
(Continued)

FOREIGN PATENT DOCUMENTS

GB      2454220         5/2012
JP      2013/234899    11/2013
(Continued)

OTHER PUBLICATIONS

International Search Report and Written Opinion of the International Searching Authority issued in International Application No. PCT/US2014/017983 on Nov. 24, 2014; 12 pages.
(Continued)

*Primary Examiner* — Thomas A Hollweg
*Assistant Examiner* — Guy Anderson
(74) *Attorney, Agent, or Firm* — Alan Bryson; Parker Justiss, P.C.

(57) ABSTRACT

The subject matter of this specification can be embodied in, among other things, a system for removably attaching an optical fiber sensor loop onto a tubular member, which includes an optical fiber sensor loop having a continuous optical fiber positioned arranged in a plurality of loops, each of said loops having a first end turn and a second end turn, a first and a second turn guide each including a plurality of turn grooves increasing outwardly in increasing radii, each of said turn grooves configured to receive an end turn portion of the optical fiber, a first and a second supporting wedge each having a planar first surface configured to
(Continued)

receive a turn guide and a curved second surface configured to be received on the tubular member, and a connector configured to couple the first mounting wedge to the second mounting wedge.

9 Claims, 6 Drawing Sheets

(51) Int. Cl.
*E21B 47/01* (2012.01)
*G01L 1/24* (2006.01)
*G02B 6/44* (2006.01)
*G02B 6/36* (2006.01)

(52) U.S. Cl.
CPC .............. *G01L 1/24* (2013.01); *G02B 6/3608* (2013.01); *G02B 6/3636* (2013.01); *G02B 6/4457* (2013.01)

(58) Field of Classification Search
USPC ..................................... 385/12–13, 135, 137
See application file for complete search history.

(56) References Cited

U.S. PATENT DOCUMENTS

| | | | |
|---|---|---|---|
| 4,290,311 A | 9/1981 | Brewer | |
| 4,296,635 A | 10/1981 | Claassen et al. | |
| 4,346,864 A | 8/1982 | Feller | |
| 4,595,165 A | 6/1986 | Klingensmith et al. | |
| 4,654,520 A * | 3/1987 | Griffiths | G01B 11/18 250/227.14 |
| 4,706,501 A | 11/1987 | Atkinson et al. | |
| 4,807,479 A | 2/1989 | Sako et al. | |
| 4,927,232 A * | 5/1990 | Griffiths | G01B 11/18 250/227.24 |
| 5,026,141 A * | 6/1991 | Griffiths | G01B 11/18 250/227.14 |
| 5,099,700 A | 3/1992 | Morin et al. | |
| 5,134,281 A * | 7/1992 | Bryenton | A61B 5/1073 250/227.14 |
| 5,196,694 A * | 3/1993 | Berthold | G01L 11/025 250/227.16 |
| 5,379,649 A * | 1/1995 | Kalotay | G01F 1/8413 73/657 |
| 5,379,836 A | 1/1995 | Jordan | |
| 6,005,242 A * | 12/1999 | Chernyak | G01L 11/025 250/227.14 |
| 6,061,492 A * | 5/2000 | Strause | G02B 6/4452 385/134 |
| 6,233,374 B1* | 5/2001 | Ogle | G01L 11/025 250/227.11 |
| 6,453,108 B1 | 9/2002 | Sirkis | |
| 6,463,813 B1* | 10/2002 | Gysling | G01L 7/04 73/579 |
| 6,490,045 B1 | 12/2002 | Dakin et al. | |
| 6,494,642 B1 | 12/2002 | Daly | |
| 6,535,684 B1* | 3/2003 | Kondo | G02B 6/3612 385/137 |
| 6,550,342 B2* | 4/2003 | Croteau | G01D 5/268 73/800 |
| 6,558,036 B2 | 5/2003 | Gysling et al. | |
| 6,785,004 B2* | 8/2004 | Kersey | G01D 5/35383 356/35.5 |
| 6,868,737 B2* | 3/2005 | Croteau | G01D 5/268 73/800 |
| 6,880,408 B1 | 4/2005 | Madden et al. | |
| 6,910,534 B2 | 6/2005 | Linyaev et al. | |
| 6,940,186 B2* | 9/2005 | Weitkamp | F03D 7/042 290/44 |
| 6,947,644 B2* | 9/2005 | Kondo | G02B 6/2821 385/135 |
| 6,983,796 B2* | 1/2006 | Bayne | E21B 17/003 166/235 |
| H2144 H * | 2/2006 | Baechtle | 385/14 |
| 7,249,525 B1* | 7/2007 | Engel | G01F 1/7082 73/861.44 |
| 7,302,139 B1 | 11/2007 | Ames | |
| 7,532,781 B2* | 5/2009 | Thompson | A61B 5/1126 385/12 |
| 7,646,945 B2* | 1/2010 | Jones | E21B 17/01 385/12 |
| 7,703,337 B1 | 4/2010 | Feller | |
| 7,779,912 B2 | 8/2010 | Gissler | |
| 7,810,265 B2 | 10/2010 | Beatty | |
| 7,963,175 B2 | 6/2011 | Gysling | |
| 8,025,445 B2* | 9/2011 | Rambow | E21B 47/011 385/147 |
| 8,365,601 B2 | 2/2013 | Minachi et al. | |
| 8,402,834 B1 | 3/2013 | Moslehi et al. | |
| 8,430,163 B2 | 4/2013 | Dupont | |
| 9,207,339 B2* | 12/2015 | Beal | G01V 1/18 |
| 9,239,406 B2* | 1/2016 | Kalia | E21B 47/10 |
| 9,273,548 B2* | 3/2016 | LeBlanc | E21B 47/06 |
| 9,347,803 B2* | 5/2016 | Uno | G01K 11/32 |
| 9,366,526 B2* | 6/2016 | Yamauchi | G01D 5/35358 |
| 2002/0064330 A1* | 5/2002 | Croteau | G01D 5/268 385/12 |
| 2003/0010126 A1 | 1/2003 | Romanet et al. | |
| 2003/0217605 A1* | 11/2003 | Croteau | G01D 5/268 73/861.44 |
| 2004/0035216 A1* | 2/2004 | Morrison | E21B 17/015 73/800 |
| 2004/0206187 A1* | 10/2004 | Williams | E21B 47/0006 73/766 |
| 2005/0100414 A1 | 5/2005 | Salama | |
| 2007/0289741 A1* | 12/2007 | Rambow | E21B 47/0006 166/250.01 |
| 2008/0095496 A1 | 4/2008 | Varadarajan et al. | |
| 2011/0109912 A1 | 5/2011 | Spross et al. | |
| 2011/0116098 A1 | 5/2011 | Spross et al. | |
| 2011/0116099 A1 | 5/2011 | Spross et al. | |
| 2011/0220411 A1 | 9/2011 | Dupont | |
| 2011/0292384 A1* | 12/2011 | Ramos | G01B 11/18 356/301 |
| 2012/0096935 A1* | 4/2012 | Finke | E21B 47/01 73/152.03 |
| 2012/0099097 A1 | 4/2012 | Coupe et al. | |
| 2012/0312552 A1 | 12/2012 | Rayssiguier | |
| 2013/0028555 A1 | 1/2013 | Dailey | |
| 2013/0120756 A1 | 5/2013 | Spross | |
| 2013/0128276 A1 | 5/2013 | Spross et al. | |
| 2013/0141733 A1 | 6/2013 | Spross et al. | |
| 2014/0345740 A1* | 11/2014 | Demanze | G01M 3/40 138/137 |
| 2015/0092818 A1* | 4/2015 | Hill | G01B 11/16 374/161 |

FOREIGN PATENT DOCUMENTS

| | | |
|---|---|---|
| WO | WO 99/36757 | 7/1999 |
| WO | WO 2009/056853 | 5/2009 |

OTHER PUBLICATIONS

International Search Report and Written Opinion issued in International Application No. PCT/US2013/077990 on Sep. 25, 2014, 15 pages.

Sobolewski et al., "Improved Sagnac Pulse Detection System Background," U.S. Appl. No. 61/818,683, filed May 2, 2013, 10 pages.

Ouyang et al, "Design of a New Compliant Mechanical Amplifier," ASME 2005 International Design Engineering Technical Conferences and Computers and Information in Engineering Conference, Paper No. DETC2005-84371, 2005, 10 pages.

Ried et al., "6-MHz 2-N/m piezoresistive atomic-force microscope cantilevers with INCISIVE tips," Microelectromechanical Systems, Journal of , vol. 6, No. 4, Dec. 1997, pp. 294-302.

(56) References Cited

OTHER PUBLICATIONS

Folch et al., "Microfabrication of oxidation-sharpened silicon tips on silicon nitride cantilevers for atomic force microscopy," Microelectromechanical Systems, Journal of , vol. 6, No. 4, Dec. 1997, pp. 303-306.
Lagorce et al., "Magnetic and mechanical properties of micromachined strontium ferrite/polyimide composites," Microelectromechanical Systems, Journal of , vol. 6, No. 4, Dec. 1997, pp. 307-312.
Liwei et al., "A micro strain gauge with mechanical amplifier," Journal of Microelectromechanical Systems, vol. 6, No. 4, Dec. 1997, pp. 313-321.
Burdess et al., "A system for the dynamic characterization of microstructures," Microelectromechanical Systems, Journal of , vol. 6, No. 4, Dec. 1997 pp. 322-328.
Marques et al., "Fabrication of high-aspect-ratio microstructures on planar and nonplanar surfaces using a modified LIGA process," Microelectromechanical Systems, Journal of , vol. 6, No. 4, Dec. 1997, pp. 329-336.
Luginbuhl et al., "Microfabricated Lamb wave device based on PZT sol-gel thin film for mechanical transport of solid particles and liquids," Microelectromechanical Systems, Journal of , vol. 6, No. 4, Dec. 1997, pp. 337-346.
Bourouina et al., "Preliminary results on a silicon gyrometer based on acoustic mode coupling in small cavities," Microelectromechanical Systems, Journal of , vol. 6, No. 4, Dec. 1997, pp. 347-354.
Koeneman et al., "Feasibility of micro power supplies for MEMS," Microelectromechanical Systems, Journal of , vol. 6, No. 4, Dec. 1997, pp. 355-362.
Tea et al., "Hybrid postprocessing etching for CMOS-compatible MEMS," Microelectromechanical Systems, Journal of , vol. 6, No. 4, Dec. 1997, pp. 363-372.

\* cited by examiner

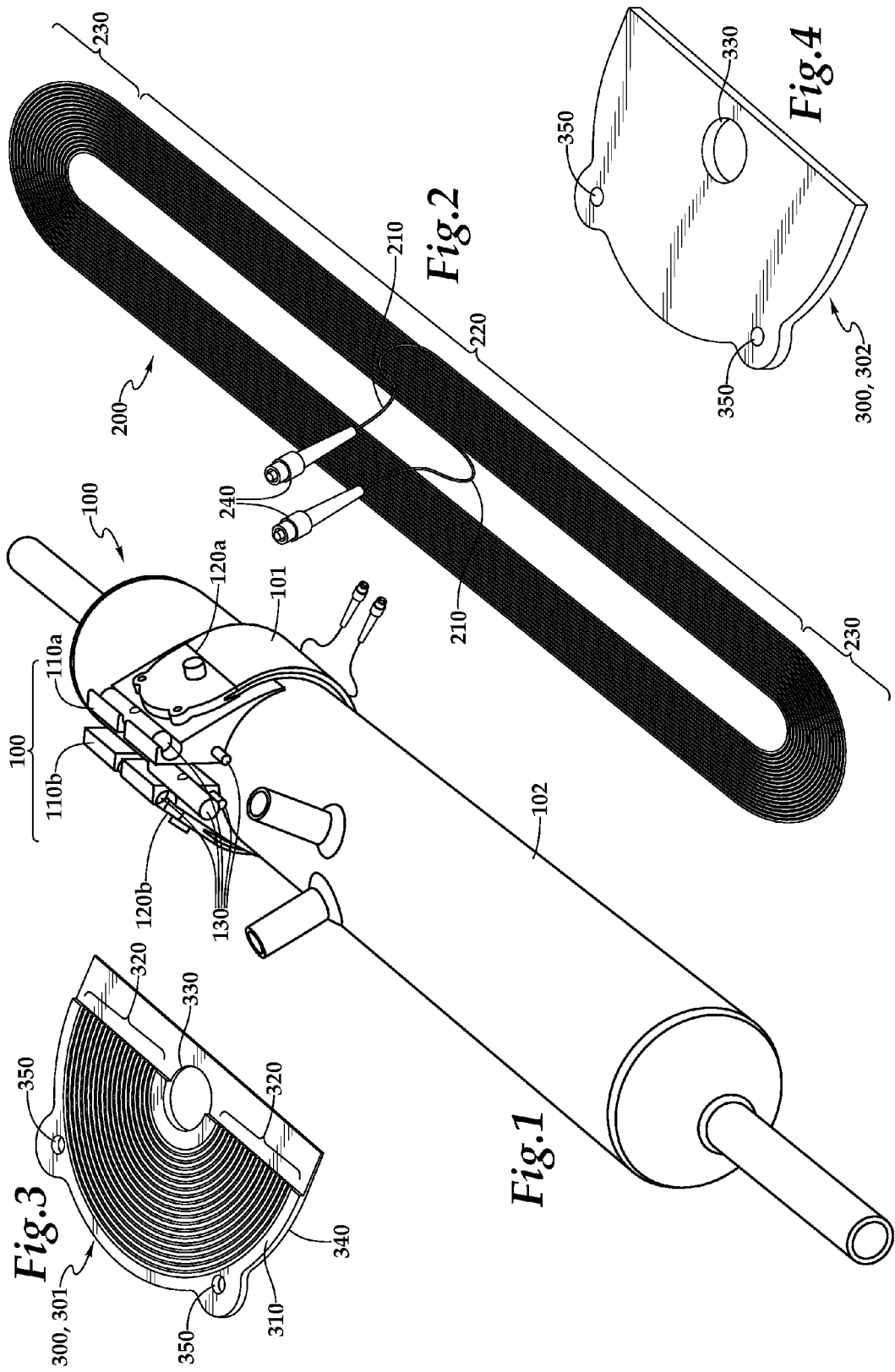

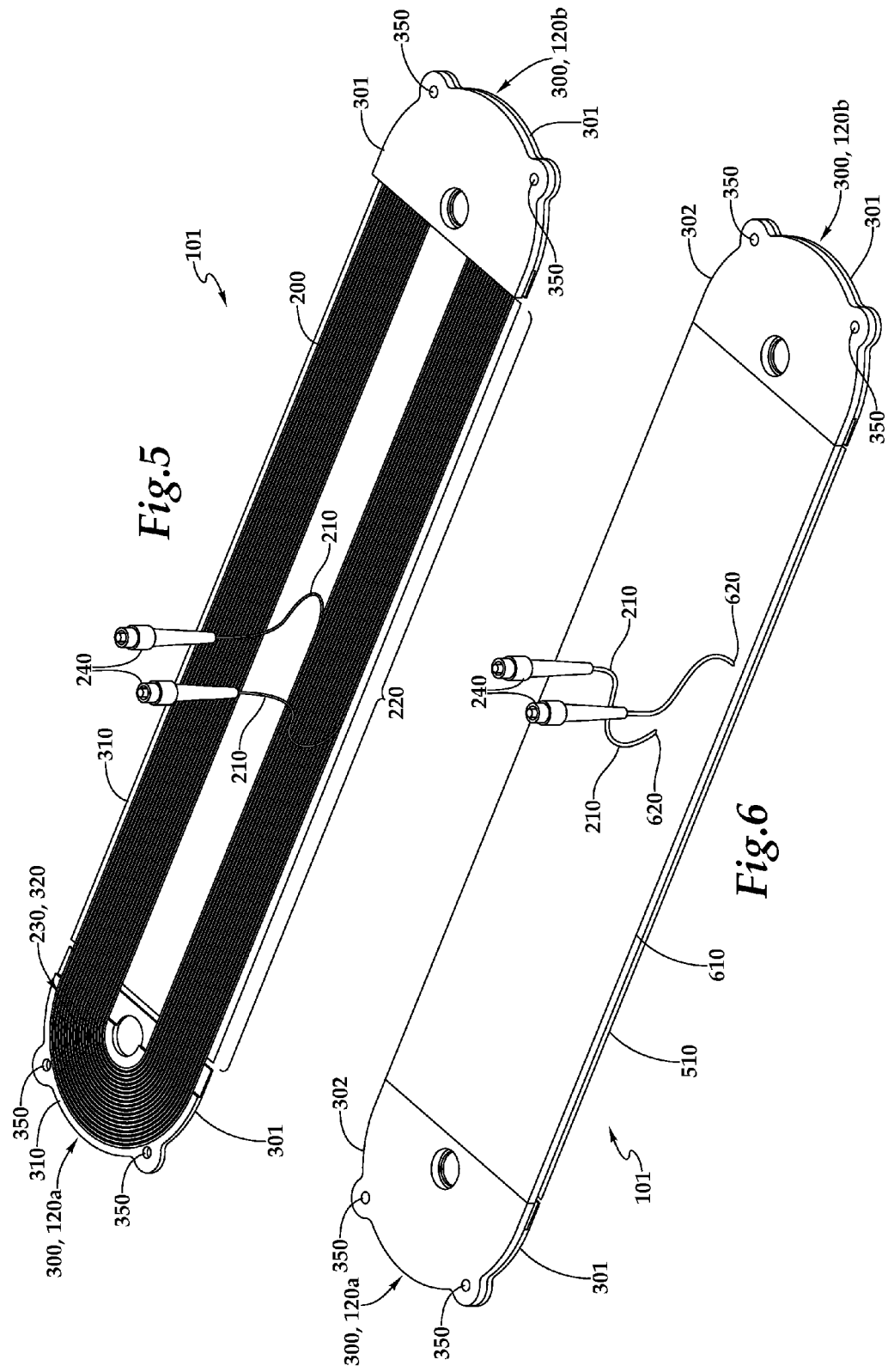

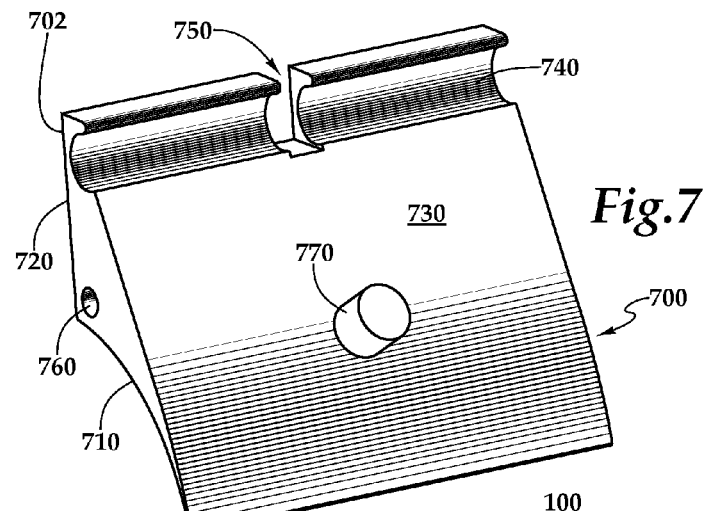
*Fig.7*
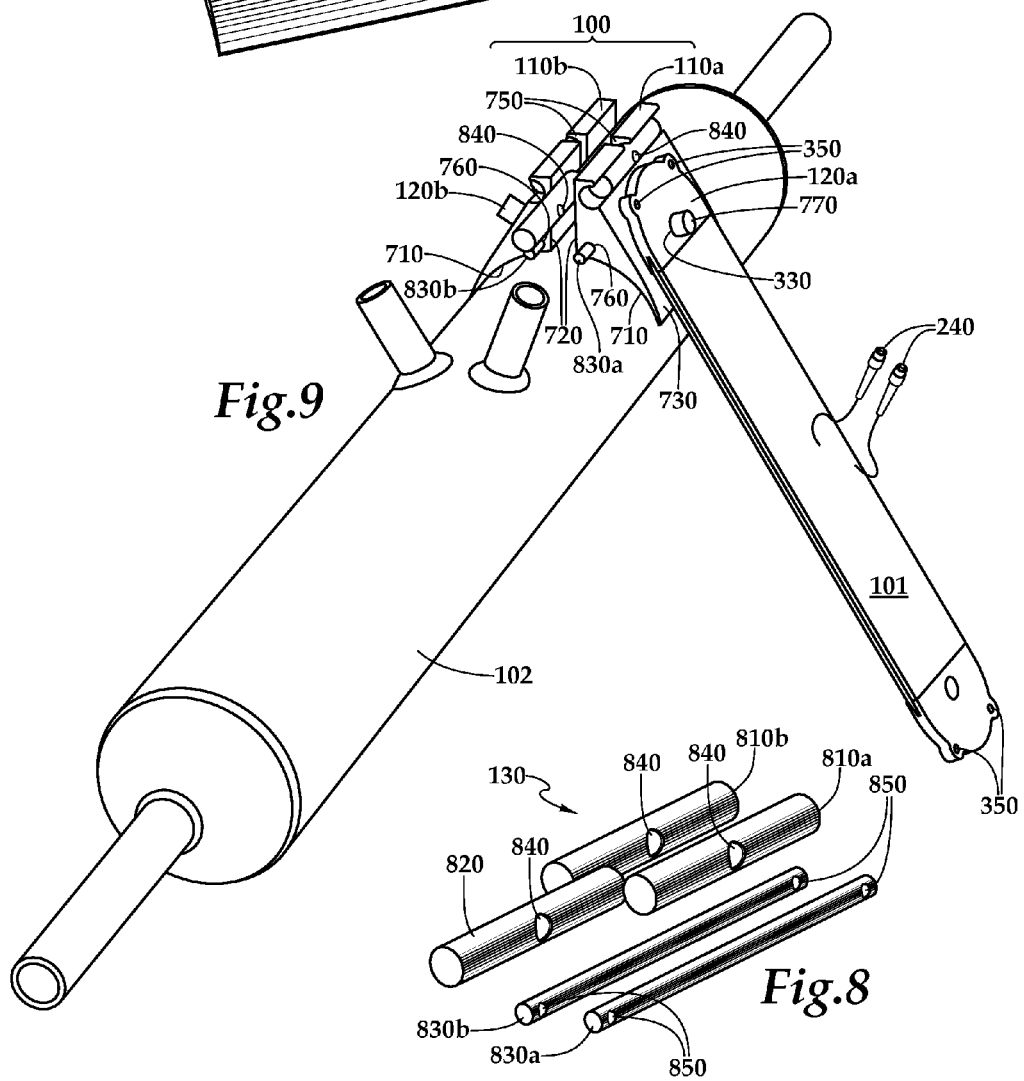
*Fig.9*
*Fig.8*

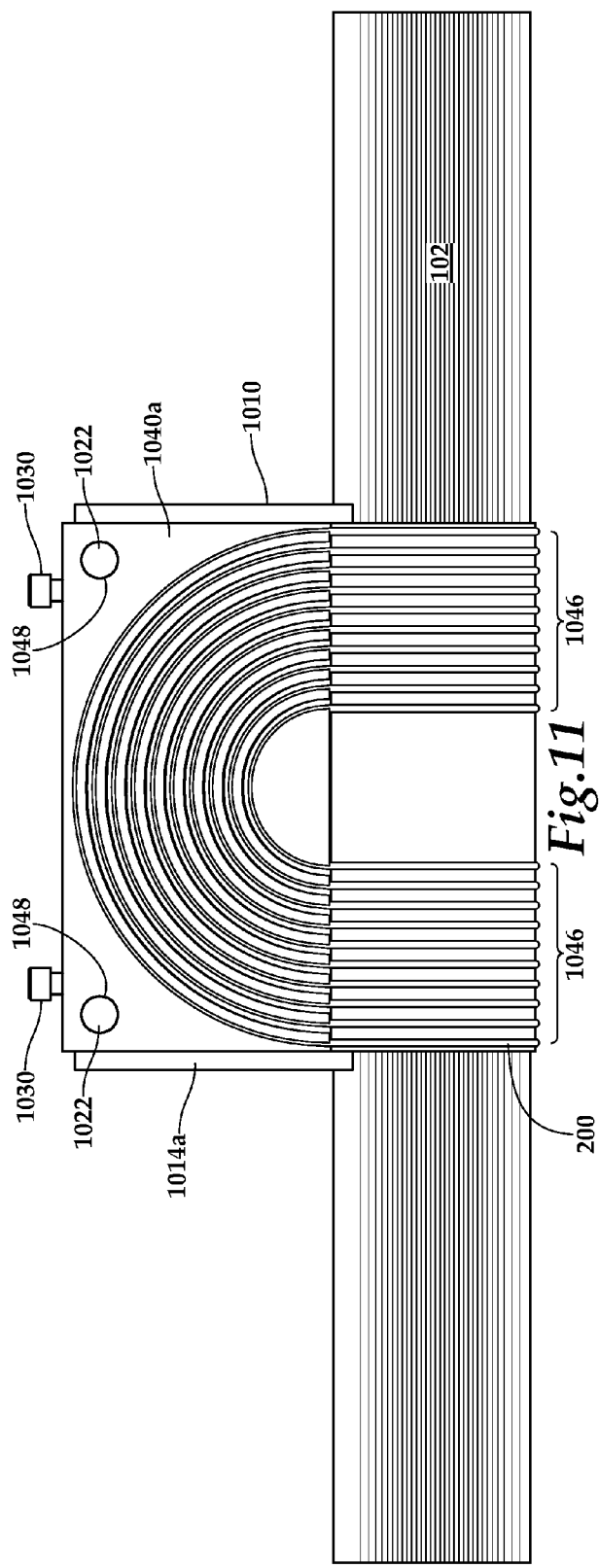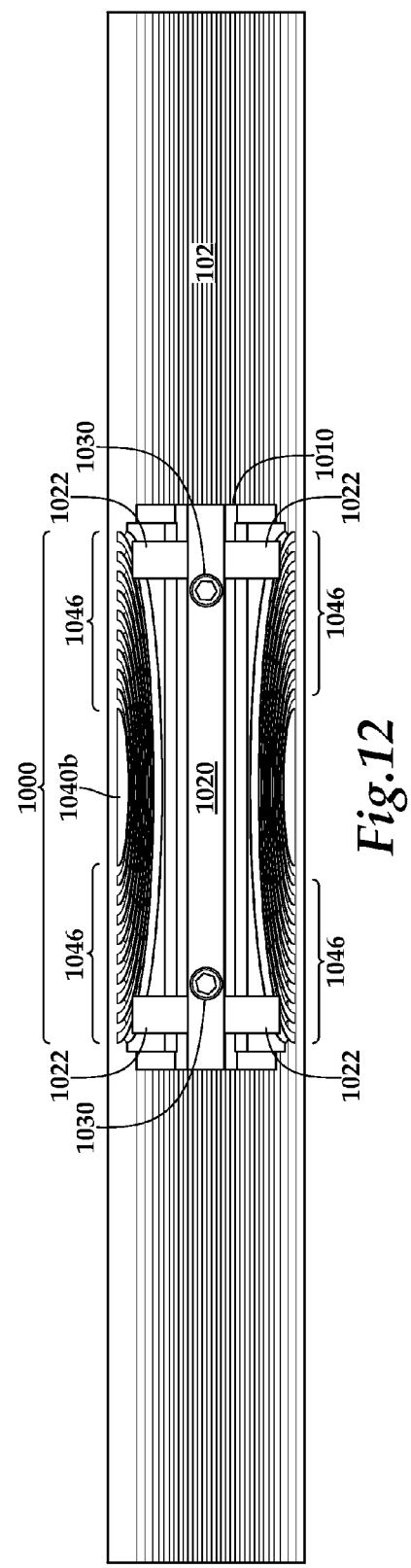

PORTABLE ATTACHMENT OF FIBER OPTIC SENSING LOOP

CLAIM OF PRIORITY

This application is a U.S. National Stage of International Application No. PCT/US2014/017983, filed Feb. 24, 2014.

TECHNICAL FIELD

This present disclosure relates to an apparatus for mounting of fiber optic sensing elements on pipe sections.

BACKGROUND

In connection with the recovery of hydrocarbons from the earth, wellbores are generally drilled using a variety of different methods and equipment. According to one common method, a drill bit is rotated against the subsurface formation to form the wellbore. The drill bit is rotated in the wellbore through the rotation of a drill string attached to the drill bit and/or by the rotary force imparted to the drill bit by a subsurface drilling motor powered by the flow of drilling fluid down the drill string and through downhole motor.

The flow of drilling fluid through the drill string can exhibit variations in pressure including pressure pulses. These pressure variations can cause dimensional changes in solid structures such as piping that carries the drilling fluid to and from the drill string. Strain gauges are sometimes used for detecting and measuring absolute dimensional changes of solid structures, such a piping for drilling fluid. Such changes can occur gradually, however, and may be challenging to observe and quantify.

DESCRIPTION OF DRAWINGS

FIG. 1 is a perspective view of an example optical sensor mounting system.

FIG. 2 is a perspective view of an example optical sensor loop.

FIG. 3 is perspective view of an inner surface of an example optical sensor loop turn guide.

FIG. 4 is perspective view of an outer surface of an example optical sensor loop turn guide.

FIG. 5 is a perspective view of an example optical sensor in a partially assembled state.

FIG. 6 is a perspective view of an example optical sensor in an assembled state.

FIG. 7 is a perspective view of an example mount wedge.

FIG. 8 is a perspective view of a collection of example tension rods.

FIG. 9 is a perspective view of another example optical sensor mounting system.

FIGS. 11 and 12 are side and top views of the example optical sensor mounting system of FIG. 10.

DETAILED DESCRIPTION

Figure 10:
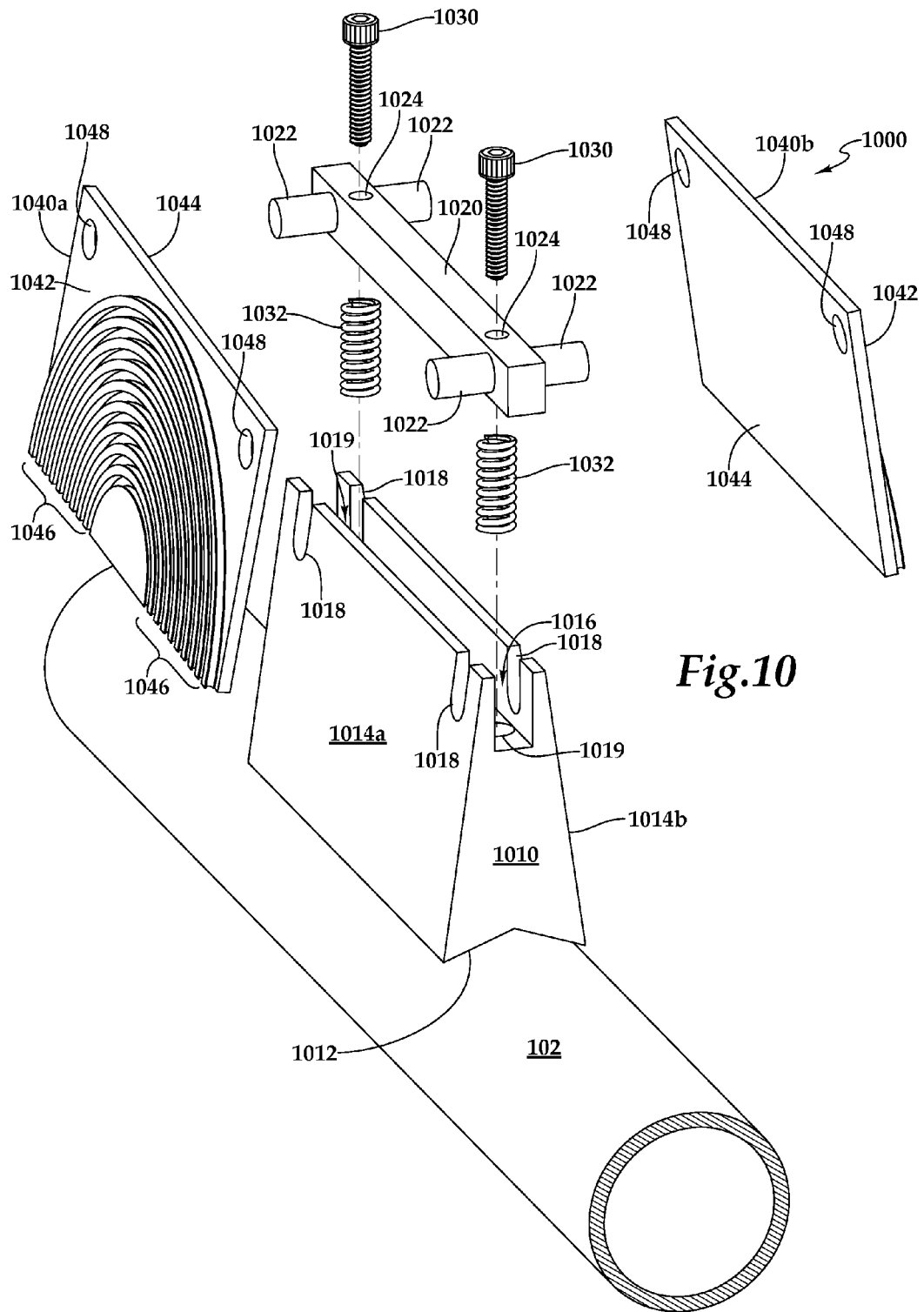
FIG. 10 is an exploded perspective view of another example optical sensor mounting system.

This document describes systems and techniques for mounting sensor attachments to drilling fluid piping on drilling rigs. The assemblies described in this document can be used, for example, to mount optical sensors such as sections of Sagnac loop interferometers to measure expansion and contraction of the piping due to pressure variations in the fluid flowing within the piping. The Sagnac Loop interferometer is a sensor that can be used to detect mechanical or thermal disturbances or vibrations. The Sagnac interferometer operates by generating a light signal with a predetermined wavelength, transmitting the light signal through an optical fiber loop, and detecting the resulting coherent light phase shift. Measurements of the shifts in the coherent light phase provide information regarding physical disturbances or vibrations along the loop of the Sagnac interferometer.

In general, optical sensor mounts clamp, attach, or are otherwise affixed to an outside surface of one or more pipes in the drilling fluid piping system. Fluid (for example, drilling fluid) flowing through the pipe exerts a pressure force outward against the pipe, which causes small changes in the diameter of the pipe that vary with the pressure of the fluid within. The optical sensor mounts mechanically transfer, and in some implementations, amplify or reduce, changes in pipe diameter to one or more sensors. The signal outputs of such sensors can then be processed to observe changes in the diameter of the pipe. The changes in diameter of the pipe diameter may be processed using known physical characteristics of pressure pipes, and detection of said changes can allow for downhole pressure pulse detection whereas said pressure pulses can convey the specific information or data content.

FIG. 1 is a perspective view of an example optical sensor mounting system 100. In general, the mounting system 100 simplifies attachment and removal of an optical sensor 101, such as a fiber optic loop section of a Sagnac Loop interferometer, a Mach-Zehnder interferometer, a distributed Acoustic Sensing System (DASS), or any other appropriate sensor that includes one or more loops of fiber optic cable, to and from a pipe 102 while preserving signal fidelity and rotational signal rejection of the optical sensor 101.

The optical sensor mounting system 100 includes a pair of mount wedges 110a and 110b. The optical sensor 101 is wrapped around the periphery of the pipe 102, and is removably affixed to the mount wedges 110a, 110b by a pair of sensor loop turn guide assemblies 120a and 120b. The mount wedges 110a, 110b are flexibly interconnected by a collection of tension rods 130. The optical sensor 101 is wrapped around the pipe 102 and is adjusted to a predetermined pre-tension by adjustment of the linkage between the tension rods 130. The optical sensor 101 is configured to detect changes in the length of the optical sensor 101 (e.g., stretching). In the illustrated configuration, expansion or contraction of the circumference and diameter of the pipe 102 due to changes in the pressure of a fluid within the pipe 102 will apply changes in tension on the optical sensor 101 that can be measured and used to determine changes in the fluid pressure within the pipe 102. The optical sensor 101, the mount wedges 110a and 110b, the sensor loop turn guide assemblies 120a-120b, and the tensioning rods 130 with associated linkage will be discussed further in the descriptions of FIGS. 2-9.

FIG. 2 is a perspective view of an example optical sensor loop 200. The optical sensor loop 200 includes a fiber optic cable 210 arranged in an elongated spiral having a middle section 220 in which the fiber optic cable 210 is arranged as a collection of generally planar and substantially parallel strands, and two end sections 230 in which the fiber optic cable 210 is arranged as a collection of generally planar and curved pathways. In some implementations the curved pathways may be arranged substantially concentric and semi-circular and/or in a partial elliptical arrangement.

The fiber optic cable 210 is terminated at each end by a pair of optical couplers 240. The optical couplers 240 provide connecting points to which light sources, optical detectors, and other appropriate equipment can be optically coupled to the fiber optic cable 210.

FIGS. 3 and 4 are perspective views of an example optical sensor loop turn guide 300. FIG. 3 shows an optical sensor loop lower turn guide 301 and FIG. 4 show an optical sensor loop upper turn guide 302. In general, the optical sensor loop lower turn guide 301 and the optical sensor loop upper turn guide 302 are coupled together to form the example sensor turn guide assembly 120a of FIG. 1, and the optical sensor loop lower turn guide 301 and the optical sensor loop upper turn guide 302 are coupled together to form the example sensor turn guide assembly 120b.

Referring to FIG. 3, an inner face 310 of the optical sensor loop lower turn guide 301 is shown. The optical sensor loop lower turn guide 301 includes a bore 330 and a collection of bores 350. The inner face 310 includes a collection of grooves 320. The grooves 320 are arranged as a collection of ridges and troughs formed on the inner face 310 in a curved pathway. The grooves 320 are non-intersecting, and increase outwardly with increasing radii. In some implementations the curved pathways may be arranged substantially concentric and semi-circular and/or in a partial elliptical arrangement. Each of the grooves 320 is configured to receive a portion of the optical fiber 210 at one of the end sections 230.

Referring to FIG. 4, the optical sensor loop upper turn guide 302 of the sensor loop turn guide 300 is shown. The optical sensor loop upper turn guide 302 includes the bore 330 and the bores 350. In some implementations, the optical sensor loop upper turn guide 302 is a substantially flat plate that, when assembled to the optical sensor loop lower turn guide 301, contacts the ridges or the grooves 320 to substantially enclose and constrain the fiber optic cable 210 with each of the grooves 320.

FIG. 5 is a perspective view of the example optical sensor 101 in a partially assembled state. As is best seen in reference to the sensor loop turn guide assembly 120a, each loop of the end sections 230 of the sensor loop 200 is placed in one of the corresponding grooves 320 of the optical sensor loop lower turn guide 301. The optical sensor loop upper turn guide 302 is placed adjacent the optical sensor loop lower turn guide 301, as is best seen in reference to the sensor loop turn guide assembly 120b. In the assembled configurations of the sensor loop turn guide assemblies 120a, 120b, each mating pair of the optical sensor loop lower turn guide 301 and the optical sensor loop upper turn guide 302 substantially surrounds and constrains a corresponding loop of the sensor loop 200.

A bottom sheath 510 is provided to support and protect the middle section 220 of the sensor loop 200. Referring now to FIG. 6, which is a perspective view of the example optical sensor 101 in an assembled state, a top sheath 610 is provided to support and protect the middle section 220 of the sensor loop 200. The top sheath 610 includes holes 620. The fiber optic cable 210 passes through the holes 620 to expose the optical couplers 240.

The top sheath 610 and the bottom sheath 510 are flexible to allow the sensor loop to be bent into a curve. In some embodiments, the top sheath 610 and the bottom sheath 510 can have a flexible stiffness that limits the bending radius of the sensor loop 200. For example, fiber optic cable 210 may have a maximum bending radius which, if exceeded, could damage the fiber optic cable 210 in a way that prevents light from passing through and thus possibly causing the sensor loop 200 to malfunction. The top sheath 610 and bottom sheath 510, however, can have a stiffness and bending radius that are greater than that of the fiber optic cable 210, so that the sensor loop 200 will follow the relatively lesser bending radius of the sheaths 510, 610 when flexed.

Referring now to FIGS. 3-6, the sensor loop turn guides 300 also include the collection of bores 350. During assembly, pairs of the sensor loop turn guides 301 and 302 are mated to align the bores 350, and a collection of fasteners (not shown) (e.g., bolts, screws) are passed through the bores 350 to removably attach the pairs to each other to form the sensor loop turn guide assemblies 120a and 120b. During assembly, the collection of fasteners are also passed through the bores 350 to removably assemble the sensor loop turn guide assemblies 120a and 120b to the mount wedges 110a and 110b.

FIG. 7 is a perspective view of an example mount wedge 700. In some embodiments, the mount wedge 700 can be the mount wedge 110a or the mount wedge 110b of FIG. 1. The mount wedge 700 includes a bottom face 710, a back face 720, and a mount face 730.

The bottom face 710 is formed with a longitudinal concave curvature. In some embodiments, the radius of the bottom face 710 approximates the radius of the pipe 102 of FIG. 1. The back face 720 is a substantially flat planar surface that intersects the bottom face 710 at an approximately perpendicular angle. The front face 730 is a substantially flat planar surface that intersects the back face 720 at an approximately 45 degree angle and intersects the bottom face 710 at an angle approximately tangent to the curvature of the bottom face 710. In some embodiments, the angle at which the front face 730 and the back face 720 intersect can be determined from the diameter of pipe 102, The front face 730 includes a groove 740. The groove 740 is a semi-cylindrical, concave recess formed along the longitudinal length (e.g., relative to the axis of curvature of the bottom face 710) of a distal end 702 of the mount wedge 700. A slot 750 cut out of the distal end 702, intersecting the groove 740 near a midpoint substantially perpendicular to the groove 740. A longitudinal bore 760 is formed through the mounting wedge substantially parallel to the faces 710, 720, and 730. The groove 740, the slot 750, and the bore 760 will be discussed further in the descriptions on FIGS. 8 and 9.

The front face 730 also includes a mounting post 770. The mounting post 770 protrudes out from the mount wedge 700 at an angle substantially perpendicular to the front face 730. The mounting post 770 is configured to mate with the bores 330 of the sensor loop turn guides 300, as will be discussed further in the descriptions on FIG. 9. In some embodiments, the mounting post 770 may be a threaded member that can be removably threaded into a corresponding threaded receptacle in the front face 730.

FIG. 8 is a perspective view of the collection of example connector rods 130. The collection includes an outer rod 810a, an outer rod 810b, a center rod 820, a through-wedge rod 830a, and a through-wedge rod 830b. The outer rods 810a and 810b have a diameter that approximates or is less than that of the groove 740 of the example mount wedge 700 of FIG. 7. The outer rods 810a, 810b and the center rod 820 each include a bore 840. The bores 840 are formed near the midpoints and perpendicular to the longitudinal lengths of their corresponding rods 810a, 810b, and 820.

The through-wedge rods 830a and 830b have a diameter that allows the rods 830a, 830b to be inserted into the bore 760. The through-wedge rods 830a and 830b each also include a pair of bores 850, with each bore 850 formed near an end and perpendicular to the longitudinal lengths of their corresponding through-wedge rods 830a and 830b. The collection of rods 130 will be discussed further in the description of FIG. 9.

FIG. 9 is another perspective view of the example optical sensor mounting system 100 in a partly assembled form. During assembly, the mount wedges 110a and 110b are arranged such that their bottom faces 710 are in contact with the pipe 102, and their back faces 720 are facing each other. The sensor loop turn guide assembly 120a is brought into contact with the mount wedge 110a such that the mount post 770 passes through the bores 330 such that one of the bottom faces 710 contacts the front face 730. A fastener (not shown) (e.g., bolt, screw, rivet) is passed through each of the bores 350 to removably attach the sensor loop turn guide assembly 120a to the mount wedge 110a.

The optical sensor 101 is wrapped around the pipe 102, and the sensor loop turn guide assembly 120b is assembled to the mount wedge 110b in a manner similar to the assembly of the turn guide assembly 120a and the mount wedge 110a (e.g., as illustrated in FIG. 1). The through-wedge rod 830a is inserted into the bore 760 in the mount wedge 110a, and the through-wedge rod 830b is inserted into the bore 760 in the mount wedge 110b.

The outer rod 810a is placed in the groove 740 of the mount wedge 110a, and the outer rod 810b is placed in the groove 740 of the mount wedge 110b. The center rod 820 is placed between the mount wedges 110a and 110b. The bores 840 in outer rod 810a, the outer rod 810b, and the center rod 820 are aligned with the slots 750 and with each other. A fastener (not shown) (e.g., a bolt, a screw) is passed through the aligned bores 840 and is adjustably tensioned. Tension on the fastener draws the mount wedges 110a and 110b toward each other, which in turn applies an adjustable pre-tension on the optical sensor 101. In some embodiments, the bores 850 of the rods 830a and 830b can be aligned, a collection of fasteners (not shown) can be passed through the bores 850 and adjustably tensioned to pre-tension the optical sensor 101 instead of or in addition to use of the outer rods 810a, 810b.

Figure 13:
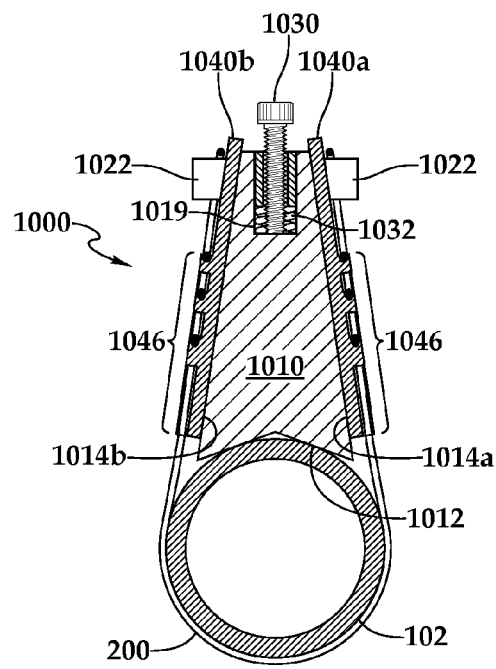
FIGS. 13-15 are various cross-sectional side views of the example optical sensor mounting system of FIG. 10.
Figure 14:
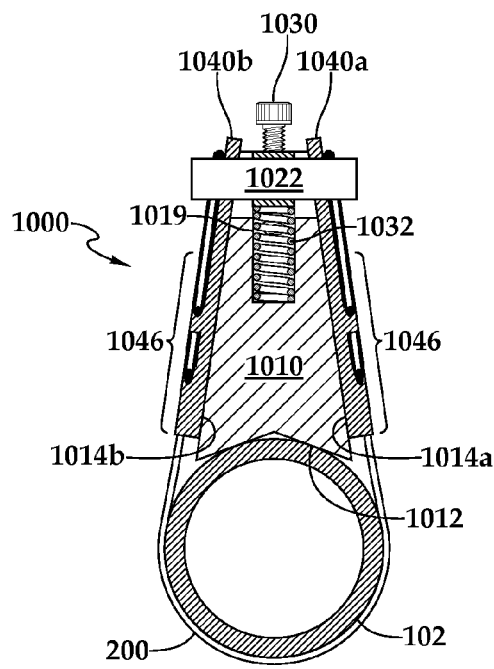
Figure 15:
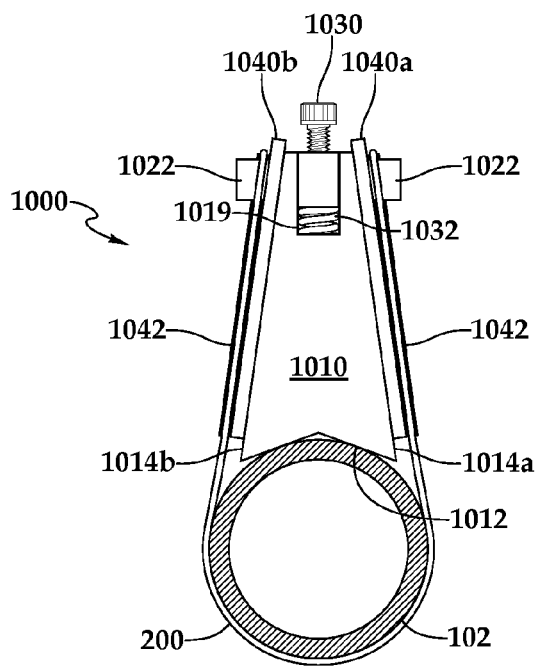

FIG. 10 is an exploded perspective view of another example optical sensor mounting system 1000. FIGS. 11 and 12 are side and top views of the optical sensor mounting system 1000. FIGS. 13-15 are various cross-sectional side views of the optical sensor mounting system 1000.

With reference to FIGS. 10-15, the optical sensor mounting system 1000 removably attaches an optical sensor loop (not shown), such as the example optical sensor loop 200 of FIG. 2, to the pipe 102. The optical sensor mounting system 1000 includes a support wedge 1010 having a bottom face 1012, a side face 1014a, a side face 1014b, and a groove 1016.

The bottom face 1012 is formed with a concave angular or curved profile that approximates the outer diameter of the pipe 102. The side faces 1014a, 1014b are substantially planar faces that intersect the bottom face 1012 at angles approximately tangent to the outer diameter of the pipe 102, and approach but do not intersect each other at the groove 1016.

The optical sensor mounting system 1000 includes a tension bar 1020. A collection of load transfer pins 1022 extend laterally outward from the tension bar 1020. The tension bar 1020 is positioned in the groove 1016 such that the load transfer pins 1022 align with and extend through a corresponding collection of lateral slots 1018 formed in the side faces 1014a and 1014b, intersecting the groove 1016. A collection of bores 1024 are formed through the tension bar 1020 perpendicular to the load transfer pins 1022.

A collection of fasteners 1030 (e.g., bolts) are passed through and protrude out the bottoms of the bores 1024. A collection of springs 1032 are placed about the protruding ends of the fasteners 1030, and the fasteners 1030 are threaded into a collection of bores 1019 formed in the groove 1016, capturing the springs 1032 between the support wedge 1010 and the tension bar 1020. The fasteners 1030 are tensioned to adjustably draw the tension bar 1020 toward the support wedge 1010 against the bias of the springs 1032. As the tension bar 1020 is drawn into the groove 1016, the load transfer pins 1022 are drawn along the lateral slots 1018 toward the pipe 102.

The optical sensor mounting system 1000 includes a sensor loop turn guide 1040a and a sensor loop turn guide 1040b. The sensor loop turn guides 1040a, 1040b each have a front face 1042 and a back face 1044. The back faces 1044 are substantially flat surfaces. Each of the front faces 1042 includes a collection of grooves 1046. The grooves 1046 are arranged as a collection of concentric, semi-circular ridges and troughs formed on the front faces 1042. The grooves 1046 are non-intersecting, and increase outwardly with increasing radii. Each of the grooves 1046 is configured to receive a portion of the optical fiber 210 of FIG. 2 at one of the end sections 230.

The sensor loop turn guide 1040a is removably assembled to the support wedge 1010 by placing the back face 1044 in contact with the side face 1014a. The load transfer pins 1022 extend through a collection of bores 1048 formed through the sensor loop turn guide 1040a. Similarly, the sensor loop turn guide 1040b is removably assembled to the support wedge 1010 by placing the back face 1044 in contact with the side face 1014b. The load transfer pins 1022 extend through a collection of bores 1048 formed through the sensor loop turn guide 1040b.

In an assembled form, the sensor loop turn guides 1040a and 1040b draw the optical sensor loop 200 about a section of the outer periphery of the pipe 102. As the fasteners 1030 are partly unthreaded, the springs 1032 urge the tension bar 1020 away from the pipe 102, adjustably tensioning the optical sensor 200 about the pipe 102.

In operation, pressurization of a fluid within the pipe 102 can cause the pipe 102 to expand. Expansion of the pipe 102 can provide additional tension to the optical sensor loop 200 as it is held to the pipe 102 by the mounting system 100 of FIGS. 1-9 or the mounting system 1000 of FIGS. 10-15. In some implementations, light passing through the optical sensor loop 200 can be affected by varying the tension applied to the optical sensor loop 200, and these effects can be measured. For example, by measuring the effects of tension on the light being passed through the optical sensor loop 200, expansion and contraction of the pipe 102 caused by pulses of fluid pressure within the pipe 102 can be measured.

Although a few implementations have been described in detail above, other modifications are possible. For example, the assembly flows discussed in the descriptions of the figures do not require the particular order described, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system for removably attaching an optical fiber sensor loop onto a tubular member, said system comprising:
   an optical fiber sensor loop having a continuous optical fiber arranged in a plurality of loops, each of said loops having a first end turn and a second end turn;
   a first turn guide including a plurality of turn grooves, each of said turn grooves configured to receive a portion of the optical fiber at the first end turn;
   a second turn guide including a plurality of turn grooves, each of said turn grooves configured to receive a portion of the optical fiber at the second end turn;
   a first supporting wedge having a first surface configured to receive the first turn guide and a second surface configured to be received on a first portion of an outer surface of the tubular member;
   a second supporting wedge having a first surface configured to receive the second turn guide and a second surface configured to be received on second portion of an outer surface of the tubular member; and
   a connector configured to couple the first supporting wedge to the second supporting wedge.

2. The system of claim 1, wherein the turn grooves are arranged substantially concentric and semi-circular.

3. The system of claim 1 further comprising:
   a first compression plate configured to be removably secured on the first turn guide over the first end turn of the optical fiber disposed in each turn groove of the first turn guide; and
   a second compression plate configured to be removably secured on the second turn guide over the second end turn of the optical fiber disposed in each turn groove of the second turn guide.

4. The system of claim 1 further comprising:
   a mounting post on the first surface of the first supporting wedge and a second mounting post on the first surface of the second supporting wedge; and
   a first mounting opening in the first turn guide configured to receive the first mounting post and a second mounting opening configured to receive the second mounting post.

5. The system of claim 1, wherein the connector comprises:
   a groove disposed in the first surface of the first supporting wedge and a groove in the first surface of the second supporting wedge;
   a first rod configured to be received in the groove of the first supporting wedge and a second rod configured to be received in the groove of the second supporting wedge; and
   a coupling member for coupling the first rod to the second rod.

6. The system of claim 5, wherein the coupling member includes a tension adjusting device.

7. The system of claim 6, wherein the tension adjusting device comprises a bolt positionable through an opening through the first rod and an opening through the second rod with at least one end of the bolt threaded to receive a mating threaded nut.

8. The system of any of claim 1, wherein the optical fiber sensor loop is selected from a group comprising one or more of: a section of a Sagnac interferometer, a section of a Mach-Zehnder interferometer, and a section of a distributed Acoustic Sensing System (DASS).

9. The system of claim 8, wherein the turn grooves are arranged substantially concentric and semi-circular.

* * * * *